(12) United States Patent
Watanabe et al.

(10) Patent No.: US 12,496,904 B2
(45) Date of Patent: Dec. 16, 2025

(54) SWITCH DEVICE AND METHOD FOR CONTROLLING SWITCH DEVICE

(71) Applicant: KABUSHIKI KAISHA TOKAI RIKA DENKI SEISAKUSHO, Aichi (JP)

(72) Inventors: Itaru Watanabe, Aichi (JP); Takao Imai, Aichi (JP); Masanori Fujii, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 32 days.

(21) Appl. No.: 18/574,544

(22) PCT Filed: Jun. 23, 2022

(86) PCT No.: PCT/JP2022/025114
§ 371 (c)(1),
(2) Date: Dec. 27, 2023

(87) PCT Pub. No.: WO2023/276849
PCT Pub. Date: Jan. 5, 2023

(65) Prior Publication Data
US 2024/0424897 A1     Dec. 26, 2024

(30) Foreign Application Priority Data
Jul. 2, 2021   (JP) ................... 2021-110522

(51) Int. Cl.
*B60K 35/10*     (2024.01)
*B60R 16/03*     (2006.01)
(Continued)

(52) U.S. Cl.
CPC .............. *B60K 35/10* (2024.01); *B60R 16/03* (2013.01); *G06F 3/0416* (2013.01); *G06F 3/044* (2013.01);
(Continued)

(58) Field of Classification Search
CPC .............. B60K 35/10; B60K 2360/143; B60K 2360/1434; B60K 2360/1438;
(Continued)

(56) References Cited

U.S. PATENT DOCUMENTS

2013/0021293 A1* 1/2013 Nakai ..................... G06F 3/044
                                                              345/174
2016/0085338 A1* 3/2016 Yasue ................... G06F 3/0416
                                                              345/174
(Continued)

FOREIGN PATENT DOCUMENTS

| JP | 2009-181232 A | 8/2009 |
| JP | 2010-120487 A | 6/2010 |
| JP | 2017-098118 A | 6/2017 |

*Primary Examiner* — Levi Gannon
(74) *Attorney, Agent, or Firm* — Studebaker Brackett PLLC

(57) ABSTRACT

A switch device includes an operation unit through which inputting to a controlled device is performed, a detection unit to detect an operation on the operation unit, and a control unit that, after making a determination of the operation on the operation unit detected by the detection unit, transmits a result of the determination depending on whether a function is assigned to the controlled device.

7 Claims, 6 Drawing Sheets

(51) Int. Cl.
　　　*G06F 3/041*　　　(2006.01)
　　　*G06F 3/044*　　　(2006.01)
　　　*G06F 3/0488*　　(2022.01)

(52) U.S. Cl.
　　　CPC .... *G06F 3/0488* (2013.01); *B60K 2360/1446* (2024.01)

(58) Field of Classification Search
　　　CPC ........... B60K 2360/1446; B60R 16/03; G06F 3/0416; G06F 3/044; G06F 3/0488; H01H 9/54; H01H 36/00
　　　See application file for complete search history.

(56) References Cited

U.S. PATENT DOCUMENTS

| | | | |
|---|---|---|---|
| 2017/0168639 A1* | 6/2017 | Imai | B60K 35/22 |
| 2019/0265836 A1* | 8/2019 | Tanuma | G06F 3/0418 |
| 2020/0150819 A1* | 5/2020 | Haraikawa | G06F 3/044 |

* cited by examiner

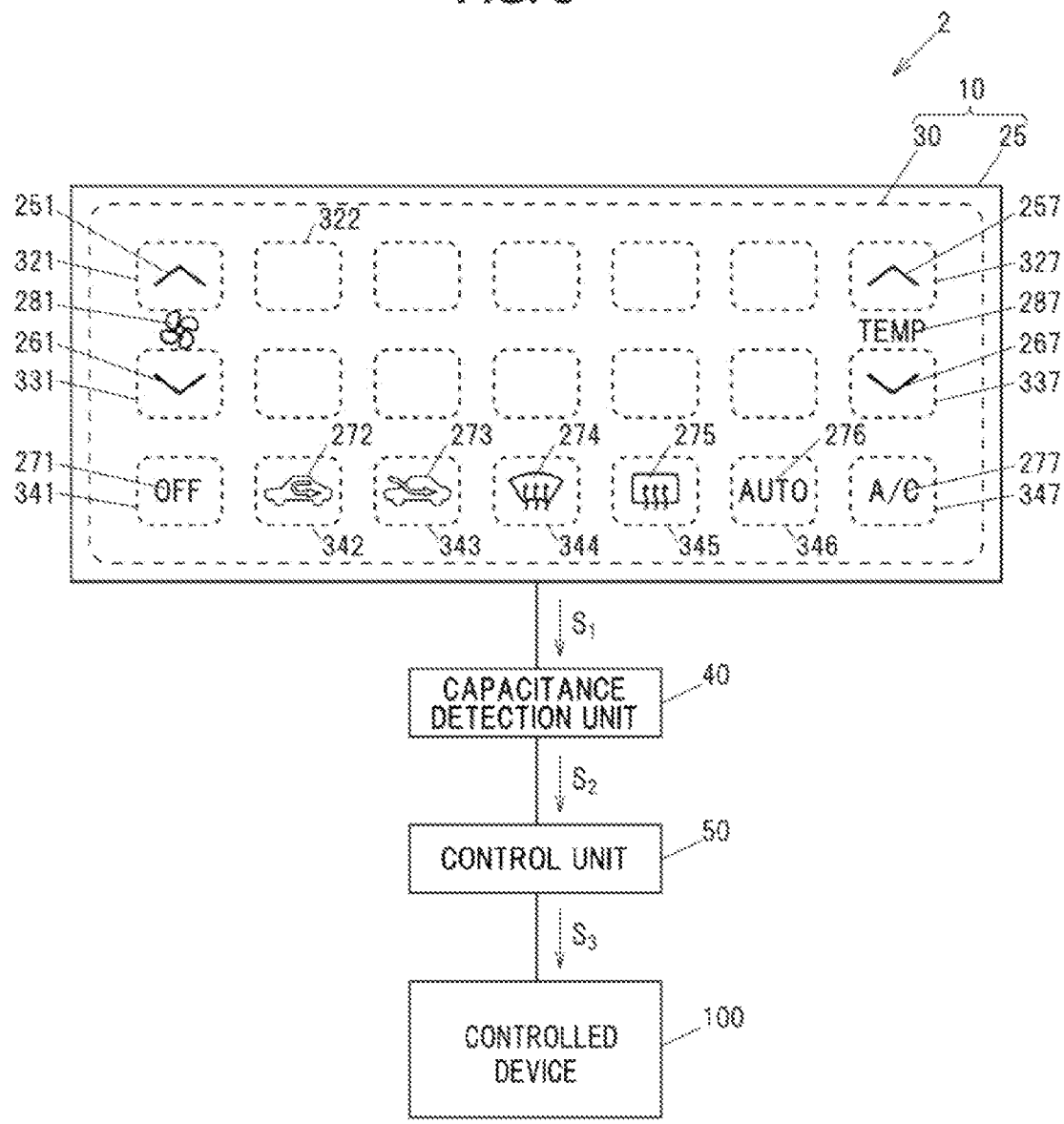

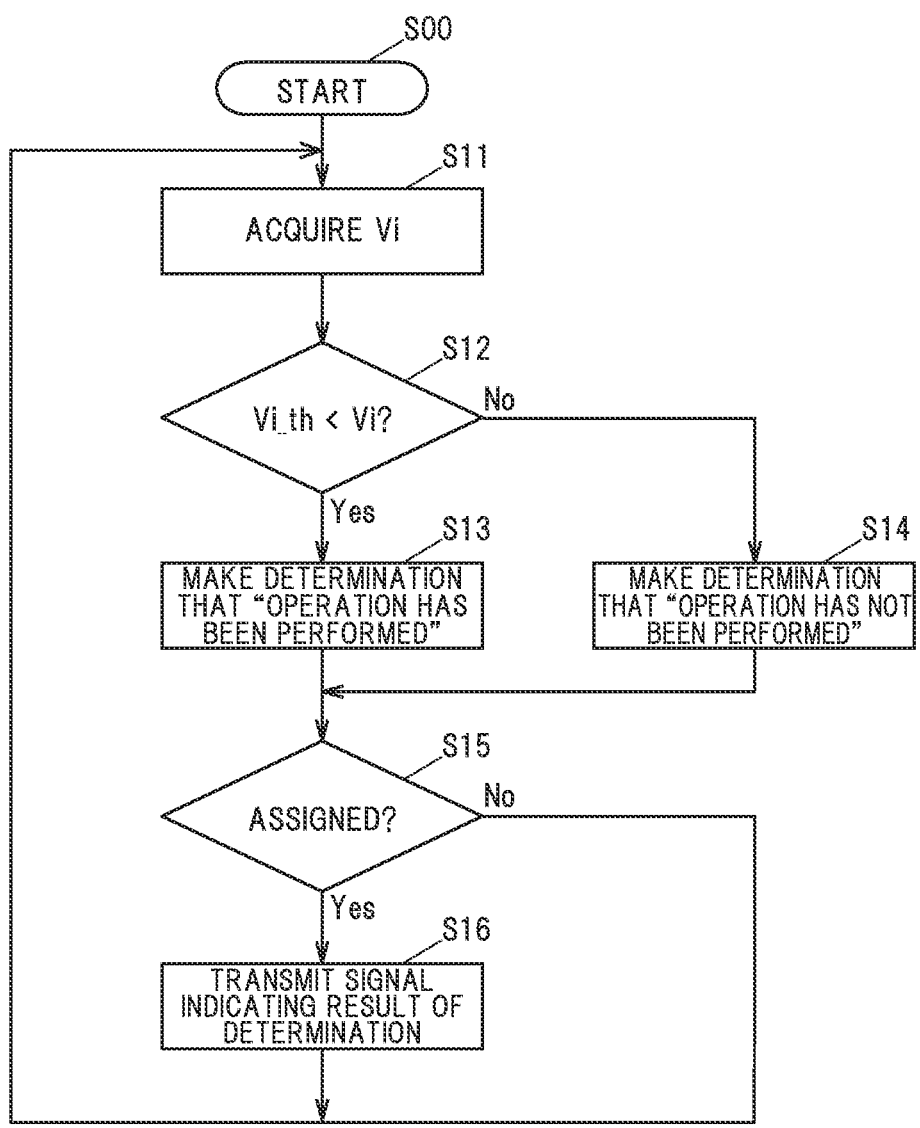

SWITCH DEVICE AND METHOD FOR CONTROLLING SWITCH DEVICE

CROSS-REFERENCE TO RELATED APPLICATIONS

The present patent application claims the priority of Japanese patent application No. 2021/110522 filed on Jul. 2, 2021, and the entire contents of Japanese patent application No. 2021/110522 are hereby incorporated by reference.

TECHNICAL FIELD

The present invention relates to a switch device and a method for controlling a switch device.

BACKGROUND ART

An example of switch device is a switch device for a vehicle such as automobile. There is also a switch device configured to be arranged in a dispersed manner, or to be arranged all together on a vehicle interior panel, etc., in consideration of the design, etc., of the vehicle interior (e.g., Patent Literature 1).

This switch device includes a decorative panel, a mask layer having operation icons, an electrode substrate having sensor electrodes of a touch sensor, a ZEBRA connector, and a control board.

At an edge of the mask layer, an electrode pattern is provided to provide identification information indicating the type of mask layer. The electrode pattern is connected to an electrode pattern of the control board through the ZEBRA connector, and the identification information in the electrode pattern is input to a control IC. Based on a detection signal from the touch sensor, the control IC changes the control of the function corresponding to the operation icon according to the identification information.

In case of this switch device, by only simply replacing the mask layer, the layout of symbols, which are operation icons of the switch device, can be changed and an intended operation corresponding to the operation icon can also be achieved.

CITATION LIST

Patent Literatures

Patent Literature 1: JP 2010/120487 A

SUMMARY OF INVENTION

The switch device disclosed in Patent Literature 1 requires the electrode pattern to provide the identification information for changing the control of a function corresponding to an operation icon, and the ZEBRA connector to convey the identification information to the control IC. In other words, it is necessary to include a configuration to convey the identification information for changing the control of the function corresponding to the operation icon to the control unit.

Therefore, it is an object of the invention to provide a switch device and a method for controlling a switch device that allow for omission of a configuration to convey identification information for changing control of a function corresponding to an operation icon to a control unit, and also allow layout of operation icons of the switch device to be changed more easily.

(1) According to an embodiment of the invention, a switch device comprises:
an operation unit through which inputting to a controlled device is performed;
a detection unit to detect at least an operation on the operation unit; and
a control unit that, after making a determination of the operation on the operation unit by the detection unit, transmits a result of the determination depending on whether a function is assigned to the controlled device.

(2) According to another embodiment of the invention, a method for controlling a switch device that comprises an operation unit through which inputting to a controlled device is performed, a detection unit to detect at least an operation on the operation unit, and a control unit that makes determination of the operation on the operation unit by the detection unit and then transmits a result of the determination, the method comprising:
making the determination by the detection unit connected to the control unit; and
then transmitting a result of the determination depending on whether a function is assigned to the controlled device.

Advantageous Effects of Invention

According to the embodiments of the invention, it is possible to provide a switch device and a method for controlling a switch device that allow layout of operation icons to be changed easily.

BRIEF DESCRIPTION OF DRAWINGS

FIG. 3 is an explanatory diagram illustrating a configuration of a switch device for a design B in the first embodiment.

FIG. 6 is a flowchart showing a program of the switch device in the second embodiment.

DESCRIPTION OF EMBODIMENTS

First Embodiment

Figure 1:
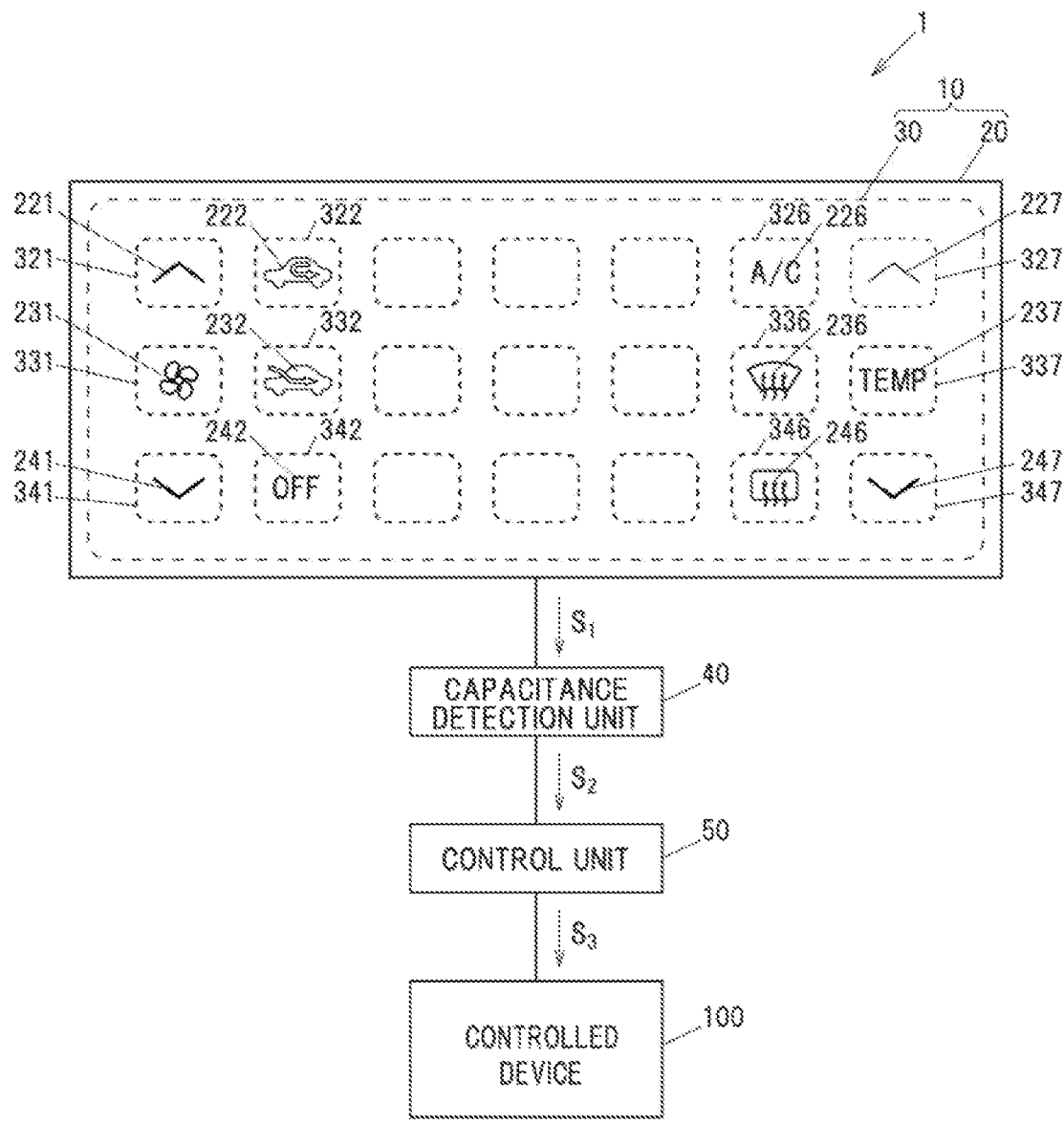
FIG. 1 is an explanatory diagram illustrating a configuration of a switch device for a design A in the first embodiment.
Figure 2A:
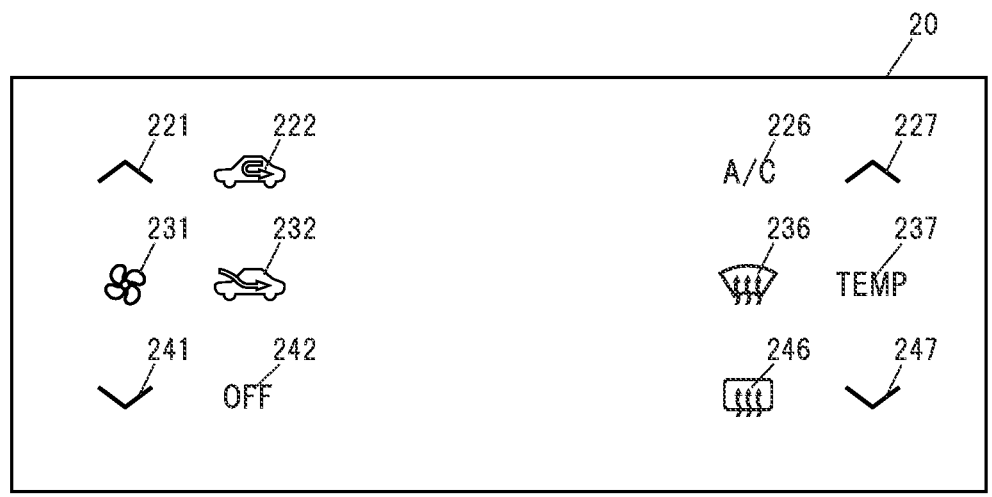
FIG. 2A is a front view showing a design panel of the switch device for the design A in the first embodiment.
Figure 2B:
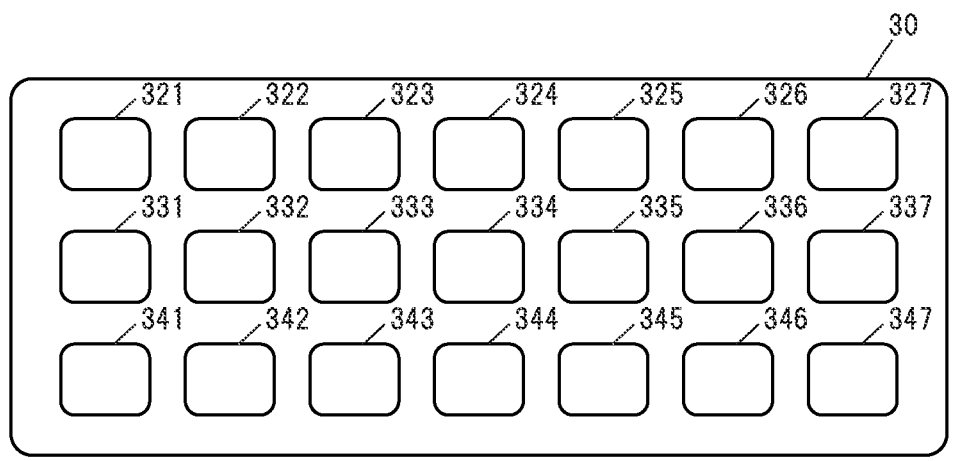
FIG. 2B is a front view showing an electrode substrate of the switch device in the first embodiment.
Figure 4A:
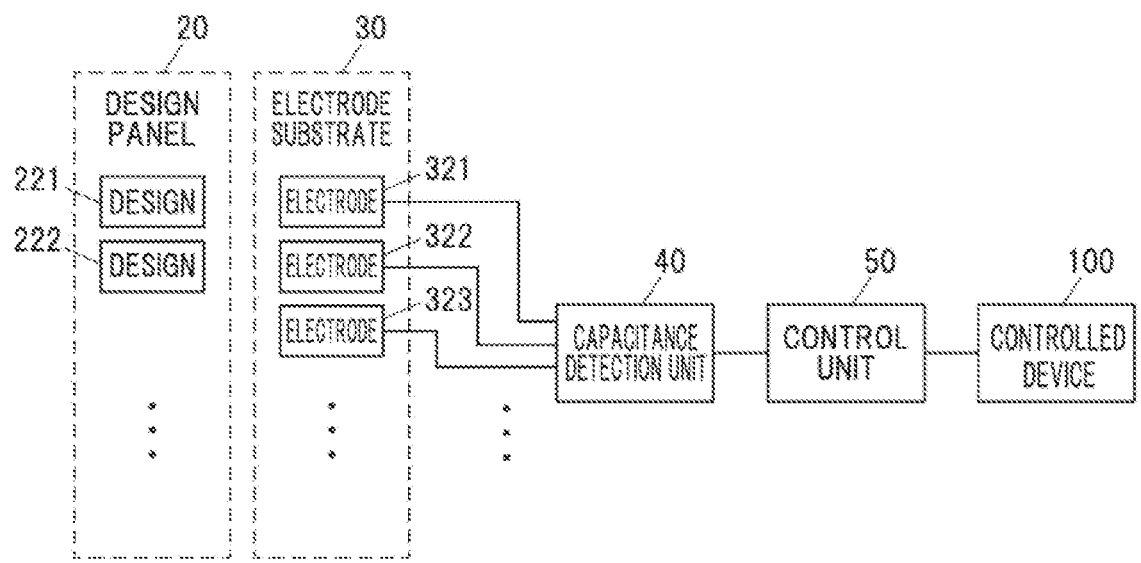
FIG. 4A is a block diagram illustrating the configuration of the switch device for the design A in the first embodiment.
Figure 4B:
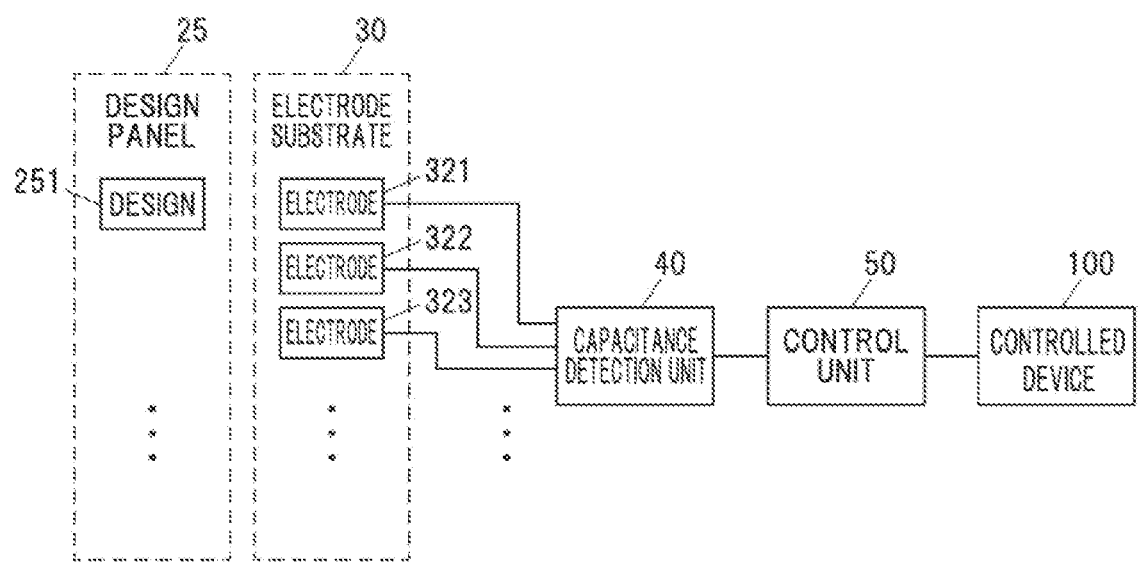
FIG. 4B is a block diagram illustrating the configuration of the switch device for the design B in the first embodiment.
Figure 5:
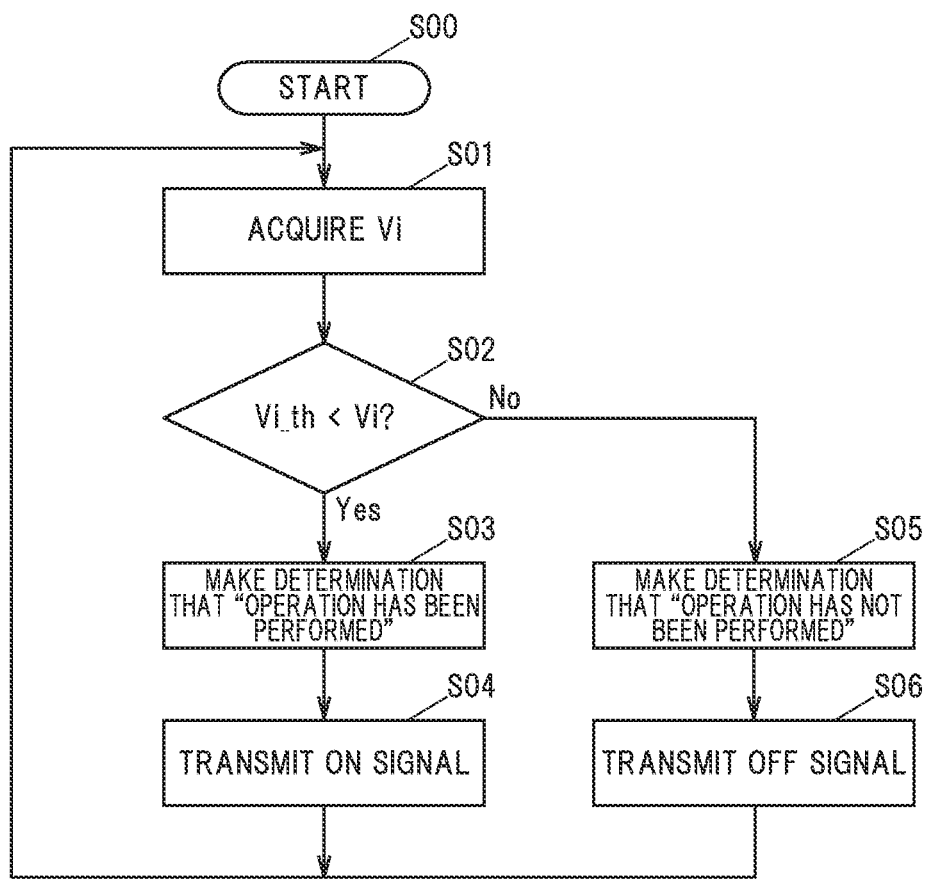
FIG. 5 is a flowchart showing a program of the switch device in the first embodiment.

FIG. 1 is an explanatory diagram illustrating a configuration of a switch device for a design A in the first embodiment. FIG. 2A is a front view showing a design panel of the switch device for the design A in the first embodiment. FIG. 2B is a front view showing an electrode substrate of the switch device in the first embodiment. FIG. 3 is an explanatory diagram illustrating a configuration of the switch device for a design B in the first embodiment. FIG. 4A is a block diagram illustrating the configuration of a switch device 1 for the design A in the first embodiment, and FIG. 4B is a block diagram illustrating the configuration of a switch device 2 for the design B in the first embodiment. FIG. 5 is a flowchart showing a program of the switch device in the first embodiment.

As shown in FIG. 1, the switch device 1 in the first embodiment is composed of an operating panel 10, a capacitance detection unit 40, and a control unit 50. The operating panel 10 is electrically connected to the capacitance detection unit 40, the capacitance detection unit 40 is electrically connected to the control unit 50, and the control unit 50 is electrically connected to a controlled device 100.

The operating panel 10 is composed of a design panel 20 serving as an operation unit, and an electrode substrate 30. The operating panel 10 is arranged such that the electrode substrate 30 on the back side as viewed from an operator overlaps the design panel 20 on the operator side. The operating panel 10 is provided on, e.g., an instrument panel of a vehicle.

The design panel 20 is a light-transmitting plate member formed of resin and has a horizontally-long outer shape.

FIG. 2A is a front view showing the design panel 20 for the design A. In this manner, on the design panel 20, plural designs 21 indicating operable functions are arranged on both the left and right sides of the design panel 20. The plural designs 21 include designs 21 indicating operable positions to be touched by an operator to operate the switch device 1, and designs 21 not indicating the operable positions. The design panel 20 for the design A has ten designs 21 indicating the operable positions and two designs 21 not indicating the operable positions.

The plural designs 21 are individual designs including an air volume setting UP design 221, an air volume design 231, an air volume setting DOWN design 241, an interior air recirculation mode design 222, a fresh air introduction mode design 232, an air blow OFF design 242, an air conditioner operation design 226, a front defroster design 236, a rear defroster design 246, an air conditioner temperature setting UP design 227, an air conditioner temperature design 237, and an air conditioner temperature setting DOWN design 247.

Of those, the designs excluding the air volume design 231 and the air conditioner temperature design 237 indicate the operable positions. The air volume design 231 and the air conditioner temperature design 237 do not indicate the operable positions.

The electrode substrate 30 is a light-transmitting plate member formed of resin and has a horizontally-long outer shape that matches the design panel 20. However, the outer shape of the electrode substrate 30 is slightly smaller in size than the design panel 20.

FIG. 2B is a front view showing the electrode substrate 30. The electrode substrate 30 has a total of twenty-one electrodes 31 (321 to 327, 331 to 337, 341 to 347) that are transparent electrodes arranged in three rows and seven columns. All the twenty-one electrodes 31 are electrically connected to the control unit 50 through the capacitance detection unit 40.

The electrode substrate 30 has the electrodes 31 on a surface facing the design panel 20 and is stacked so that the layout of the plural designs 21 on the design panel 20 matches the layout of the electrodes 31 of the electrode substrate 30, as shown in FIG. 1.

Of the plural electrodes 31, the electrodes 31 at positions coincident with the designs 21 indicating the operable positions are detection electrodes. The detection electrode is the electrode 31 that actually detects an operation and is assigned a function of the controlled device 100. In contrast, the electrodes 31 at a position not coincident with the design 21 indicating the operable position are blank electrodes. The detection electrodes are ten electrodes 31 which is the same number as the designs 21, and the blank electrodes are the remaining eleven electrodes 31. The detection electrode and the blank electrode have the same specifications but act differently according to the positional relationship with the design 21 as will be described later.

Regarding the individual electrodes as the plural electrodes 31, two rows of electrodes at each of the left and right ends in FIG. 2B, except for the electrodes 331 and 337 in FIG. 2B corresponding to the air volume design 231 and the air conditioner temperature design 237 in FIG. 2A, are the detection electrodes for the design A. The other electrodes 31 are the blank electrodes for the design A.

That is, the electrode 321, the electrode 341, the electrode 322, the electrode 332, the electrode 342, the electrode 326, the electrode 336, the electrode 346, the electrode 327 and the electrode 347 are the detection electrodes for the design A. The electrode 331, the electrode 337, the electrodes 323 to 325, the electrodes 333 to 335 and the electrodes 343 to 345 are the blank electrodes for the design A.

Next, the switch device 2 will be described. The switch device 2 differs from the switch device 1 using the design panel 20 for the design A in that a design panel 25 for the design B is used. The design panel 25 for the design B is different from the design panel 20 for the design A in the number of the designs 21 and the layout of the designs 21. Other configurations are the same, but the settings in the control unit 50 are slightly different, as will be described later.

FIG. 3 is a configuration diagram illustrating the switch device 2 that includes an operating panel 15 in which the design panel 25 for the design B and the electrode substrate 30 are stacked.

The design panel 25 for the design B has eleven designs 21 indicating the operable positions and two designs 21 not indicating the operable positions. The design panel 20 for the design A has the designs on both the left and right sides and no design in the center in the left-right direction, whereas the design panel 25 for the design B has the designs at both left and right ends and at the lower end in the vertical direction.

That is, in FIG. 3, an air volume setting UP design 251, an air volume design 281, an air volume setting DOWN design 261 and an air blow OFF design 271 are arranged at the left end. An interior air recirculation mode design 272, a fresh air introduction mode design 273, a front defroster design 274, a rear defroster design 275 and an air conditioner Auto Mode design 256 are arranged at the lower end. Then, an air conditioner temperature setting UP design 257, an air conditioner temperature design 287, an air conditioner temperature setting DOWN design 267 and an air conditioner operation design 277 are arranged at the right end.

Of those, the designs excluding the air volume design 281 and the air conditioner temperature design 287 indicate the operable positions. The air volume design 281 and the air conditioner temperature design 287 do not indicate the operable positions.

The electrode substrate 30 has the same specifications as that of the switch device 1 having the design panel 20 for the design A. However, the layout of the detection electrodes and the blank electrodes on the electrode substrate 30 is different between the switch device 1 and the switch device 2. That is, the electrodes 31 at positions coincident with the designs 21 indicating the operable positions are assigned functions of the controlled device 100 and serve as the detection electrodes. On the other hand, the electrodes 31 at positions not coincident with the designs 21 indicating the operable positions are not assigned any functions of the controlled device 100 and are present as the blank electrodes. The layout of the detection electrodes and the blank electrodes is different due to the difference in the layout of the designs indicating the operable positions between the design A and the design B.

FIG. 4A is a configuration block diagram of the switch device 1, and FIG. 4B is a configuration block diagram of the switch device 2. The configurations of the electrode substrate 30, the capacitance detection unit 40 and the control unit 50 are the same in the switch device 1 and the switch device 2. The differences between the switch device 1 and the switch device 2 are the controlled device 100 connected to the control unit 50 and the layout of the designs on the design panel corresponding thereto.

For example, regarding the electrode 322, the position of the electrode 322 coincides with the design 222 on the design panel 20 for the design A, as shown in FIG. 4A. As shown in FIG. 1, the design 222 indicates the operable position for the interior air recirculation mode. The electrode 322 is assigned a function of the controlled device 100 which is the recirculation mode indicated by the design 222. The electrode 322 here is the detection electrode.

On the other hand, the position of the electrode 322 does not coincide with any design on the design panel 25 for the design B, as shown in FIG. 4B. The electrode 322 is not assigned any function of the controlled device 100. The electrode 322 here is the blank electrode.

In this regard, the electrode 321 is a detection electrode in both the switch device 1 and the switch device 2, and the electrode 323 is a blank electrode in both the switch device 1 and the switch device 2.

The capacitance detection unit 40 is an IC (Integrated Circuit) having an AFE (Analog Front End) to detect capacitance and an A/D converter circuit to convert the detected capacitance into a digital detection value. The capacitance detection unit 40 is electrically connected to all the plural electrode portions 31. As shown in FIG. 1, analog information about the state of all the plural electrode portions 31 is input as a signal $S_1$ to the capacitance detection unit 40. The capacitance detection unit 40 converts capacitance, which is a physical quantity in the state of the electrode 31, into voltage which is digitized and detected. The detected information is output as a signal $S_2$.

The capacitance detection unit 40, which serves as the detection unit, may be provided as part of the control unit 50 described below. In this case, the signal $S_2$ is exchanged within the control unit 50.

The control unit 50 includes a microcomputer composed of a CPU (Central Processing Unit) performing calculation and processing, etc., of the acquired data according to a stored program, and a RAM (Random Access Memory) and a ROM (Read Only Memory) which are semiconductor memories, etc.

The control unit 50 has in advance a threshold value: Vi_th for each electrode 31. The threshold value for the detection electrode at a position coincident with the design 21 indicating the operable position is set to a value that serves as a reference for determining whether or not an operation has been performed. On the other hand, the threshold value for the blank electrode at a position not coincident with the design 21 indicating the operable position is set to the maximum value. The threshold value does not necessarily have to be set to the maximum value, and may be a large value that is impossible to take in practice.

The switch device 1 for the design A and the switch device 2 for the design B differ in the layout of the designs 21 indicating the operable positions and the layout of the detection electrodes and the blank electrodes. Therefore, the setting of the threshold value for each electrode 31 in the control unit 50 is different between the switch device 1 and the switch device 2.

As shown in FIG. 1, the signal $S_2$ from the capacitance detection unit 40 is input to the control unit 50. When the signal $S_2$ is input, the control unit 50 receives the signal $S_2$ for all the electrodes 31 without identifying whether each electrode 31 is a detection electrode or a blank electrode. Therefore, the control unit 50 does not require evaluation processing time to identify whether the electrode is a detection electrode or a blank electrode. Therefore, a decrease in the response speed of the switch device 1 or the switch device 2 due to the evaluation processing time does not occur. In addition, the control unit 50 does not require memory capacity to identify whether the electrode is a detection electrode or a blank electrode.

Then, based on the input signal $S_2$, the control unit 50 makes determination with respect to each electrode 31 and transmits a signal $S_3$ to the controlled device. In case of the detection electrode, the control unit 50 actually makes determination with respect to each electrode 31 that the design 21 as the operation unit has been "operated" or "not operated". On the other hand, in the case of the blank electrode, a determination is made but it is always determined that "an operation has not been performed". Then, the control unit 50 transmits a signal according to the determination.

That is, the control unit 50 makes determination with respect to the electrode 31 and transmits the signal $S_3$ as follows according to the flowchart shown in FIG. 5.

In S00, the control unit 50 starts the program.

In S01, the signal $S_2$ from the capacitance detection unit 40 is input to the control unit 50. Then, the control unit 50 acquires a value: Vi obtained by converting the capacitance of the electrode into voltage and digitizing it by the capacitance detection unit 40. Here, i is the number given to the electrode 31 and ranges from 1 to 21 (the number of the electrodes 31). Then, for each electrode 31, the control unit 50 performs the following program processing in order from i=1, regardless of whether it is a detection electrode or a blank electrode. This program processing is not limited to sequential processing, and may be parallel processing.

In S02, the control unit 50 checks whether Vi_th<Vi. In case of the detection electrode at a position coincident with the design 21 indicating the operable position, the threshold value: Vi_th is set to a value that serves as a reference for determining whether or not an operation has been performed, hence, the control unit 50 actually checks whether "an operation has been performed or not performed". On the other hand, in case of the blank electrode at a position not coincident with the design 21 indicating the operable position, the threshold value: Vi_th is set to the maximum value, hence, the result of the check will never be Vi_th<Vi.

Then, when Vi_th<Vi in S02, the program proceeds to S03. In S03, the control unit 50 determines that "an operation has been performed". Then, in S04, the control unit 50 transmits an ON signal as the signal $S_3$. The program then returns to the start which is S00.

On the other hand, when it is not Vi_th<Vi in S02, the program proceeds to S05. In S05, the control unit 50 determines that "an operation has not been performed".

Then, in S06, the control unit 50 transmits an OFF signal as the signal $S_3$. The program then returns to the start which is S00.

(Operation of the Switch Device)

When an operator touches the design 21 indicating the operable position of the switch device 1 as a switch operation, capacitance of the detection electrode at a position coincident with the design 21 changes. Then, the capacitance detection unit 40 detects the change based on the signal $S_1$ and outputs the signal $S_2$ to the control unit 50. The control unit 50 receives the signal $S_2$, determines that "an operation has been performed" according to the program, and outputs an ON signal to the controlled device 100. The controlled device 100 then operates upon the input of the ON signal from the control unit 50.

On the other hand, when the operator touches a part of the switch device 1 that is not the design 21 indicating the operable position, the ON signal is not output to the controlled device 100. That is, even if an electrode 31 is located on the back side of the touched part and the capacitance of the electrode 31 changes, the control unit 50 does not determine that "an operation has been performed" since the threshold value of the blank electrode in the control unit 50 is set to the maximum value.

When the operator is not touching the switch device 1, the capacitances of all the electrodes 31 do not change. Therefore, the control unit 50 does not determine that "an operation has been performed".

The switch device 1 using the design panel 20 for the design A and the switch device 2 using the design panel 25 for the design B have the same configuration except for the design panel, but are different in the threshold value setting for each electrode 31 in the control unit 50. Both the switch device 1 and s the witch device 2 operate based on this threshold value setting. This allows the detection electrodes at positions coincident with the designs 21 indicating the operable positions to be functional in operation of both the switch device 1 using the design panel 20 for the design A and the switch device 2 using the design panel 25 for the design B.

In addition, the control of the control unit 50 is performed after input of the signal $S_2$ from all the electrodes 31 connected to the control unit 50 through the capacitance detection unit 40 and acquisition of the value: Vi obtained by converting the capacitance of the electrode into voltage and digitizing it by the capacitance detection unit 40. If the control unit 50 performs selection based on design when the signal $S_2$ is input, processing time is taken for the selection evaluation. In addition, storage capacity for design selection patterns is required. However, the switch device 1 and the switch device 2 can maintain the switch response speed since there is no such thing as processing time for selection when the signal $S_2$ is input. In addition, there is no need for storage capacity for design selection pattern used when the signal $S_2$ is input.

Effects of the First Embodiment

The following effects are obtained in the first embodiment described above.
(1) The control unit receives the signal from the electrode and makes determination without identifying whether the electrode is a detection electrode or a blank electrode. Then, the control unit transmits the result of the determination for each electrode depending on whether the function is assigned to the controlled device. It is thereby possible to omit a configuration to convey identification information for changing the control of the function corresponding to the operation icon to the control unit. In addition, the layout of operation icons of the switch device can be changed easily.
(2) The setting of the blank electrode which does not have a detection target is to set the threshold value as a criterion for determination in the control unit to a large value. Therefore, the setting of the blank electrodes can be easily done. In addition, the layout of operation icons of the switch device can be changed easily.

Second Embodiment

FIG. 6 is a flowchart showing a program of the switch device in the second embodiment. In the following description, portions having the same configuration and function as those in the first embodiment are denoted by the same reference numerals.

This switch device 3 differs from the first embodiment in that the control unit 50 has setting information for all the electrodes 31 in advance, which is information about whether they are detection electrodes or blank electrodes, and also differs in processing by the control unit 50.

The control unit 50 performs the following process for each of the electrodes 31. In case of the detection electrode, the control unit 50 transmits a signal according to the determination. On the other hand, in case of the blank electrode, the control unit 50 does not transmit a signal according to the determination.

The control unit 50 makes determination with respect to each electrode 31 and transmits a signal according to the flowchart shown in FIG. 6.

In S00, the control unit 50 starts the program.

In S11, the control unit 50 acquires a value: Vi, which is obtained by converting the capacitance of the electrode into voltage and digitizing it by the capacitance detection unit 40, as the signal $S_2$ from the capacitance detection unit 40.

In S12, the control unit 50 checks whether Vi_th<Vi. Whether "an operation has been performed or not performed" is checked since the threshold value: Vi_th is set to a value that serves as a reference for determining whether or not an operation has been performed.

Then, when Vi_th<Vi in S12, the program proceeds to S13. In S13, the control unit 50 determines that "an operation has been performed". The program then proceeds to S15.

On the other hand, when it is not Vi_th<Vi in S12, the program proceeds to S14. In S15, the control unit 50 determines that "an operation has not been performed". The program then proceeds to S15.

In S15, the control unit 50 checks whether the acquired value: Vi is from the electrode 31 to which the controlled device 100 is assigned. That is, the control unit 50 has in advance the setting information for all the electrodes 31, which is information about whether they are detection electrodes or blank electrodes. This allows the control unit 50 to check whether the electrode is the detection electrode to which the controlled device 100 is assigned.

Then, when it is from the assigned electrode 31 in S15, the program proceeds to S16. Then, in S16, the control unit 50 transmits an ON or OFF signal, which corresponds to the determination in S13 or S14, as the signal $S_3$. The program then returns to the start which is S00.

On the other hand, when it is not from the assigned electrode 31 in S15, the program returns to the start which is S00. That is, the control unit 50 does not transmit the signal $S_3$.

That is, the control unit 50 sequentially makes the following determination with respect to each electrode 31. For all the electrodes 31, the control unit 50 determines whether the design 21 as the operation unit has been "operated" or "not operated". When the electrode is assigned a function, the control unit 50 transmits a signal according to the determination. With this method, the control unit 50 does not need to spend processing time for selection based on design when the signal $S_2$ is input.

Effects of the Second Embodiment

The following effects are obtained in the second embodiment described above.
(1) The control unit receives the signal from the electrode and makes determination without identifying whether the electrode is a detection electrode or a blank electrode. Then, the control unit transmits the result of the determination for each electrode depending on whether the function is assigned to the controlled device. It is thereby possible to omit a configuration to convey identification information for changing the control of the function corresponding to the operation icon to the control unit. In addition, the layout of operation icons of the switch device can be changed easily.
(2) The control unit has in advance the setting information for all the electrodes, which is information about whether they are detection electrodes or blank electrodes. When the electrode is assigned a function, the control unit transmits a signal according to the determination. Thus, the layout of operation icons of the switch device can be changed easily.

Although the embodiments of the invention have been described, these embodiments are merely examples and the invention according to claims is not to be limited thereto. These new embodiments and modifications thereof may be implemented in various other forms, and various omissions, substitutions and changes, etc., can be made without departing from the gist of the invention.

Although the configuration in which the electrode substrate 30 and the capacitance detection unit 40 are used as a detection unit detecting an operation based on a change in capacitance has been described in the embodiment above, it is not limited thereto. The switch device may be configured, e.g., to use a piezoelectric element and detect an operation based on a change in potential. In addition, when, e.g., the operation unit and the operation detection unit are located on the substrate, the switch device may detect a mechanical operation.

Please note that not all combinations of the features described in these embodiments are necessary to solve the problem of the invention. Further, these embodiments and modifications thereof are included within the scope and gist of the invention and also within the invention described in the claims and the range of equivalency.

REFERENCE SIGNS LIST

10 OPERATING PANEL
15 OPERATING PANEL
20 DESIGN PANEL FOR DESIGN A
25 DESIGN PANEL FOR DESIGN B
30 ELECTRODE SUBSTRATE
31 ELECTRODE
40 CAPACITANCE DETECTION UNIT
50 CONTROL UNIT
100 CONTROLLED DEVICE

The invention claimed is:
1. A switch device, comprising:
an operation unit through which inputting to a controlled device is performed;
a detection unit to detect an operation on the operation unit; and
a control unit that, after making a determination of the operation on the operation unit detected by the detection unit, transmits a result of the determination depending on whether a function is assigned to the controlled device,
wherein the detection unit comprises an electrode that detects the operation on the operation unit,
wherein the determination is made by comparison between a threshold value as a criterion for determination and a voltage value obtained by converting a capacitance of an electrode into a voltage, and
wherein a threshold value for an electrode not assigned any function of the controlled device is a greater value than a threshold value for an electrode assigned a function of the controlled device.
2. The switch device according to claim 1, wherein the control unit does not transmit the result of the determination when the electrode is not assigned the function of the controlled device.
3. The switch device according to claim 1, wherein the detection unit detects capacitance.
4. A switch device, comprising:
a design panel in which a plurality of designs including a design indicating an operable position are arranged and in which inputting to a controlled device is performed by a touch operation on the design indicating the operable position;
an electrode substrate that comprises a plurality of electrodes located on a surface facing the design panel and is stacked so that layout of at least the design indicating the operable position on the design panel matches the plurality of electrodes;
a capacitance detection unit that detects capacitances of the plurality of electrodes of the electrode substrate; and
a control unit that makes determination of an operation on the design panel by comparing the capacitance of each of the plurality of electrodes detected by the capacitance detection unit with a threshold value set for each of the plurality of electrodes, and then transmits a result of the determination depending on whether a function is assigned to the controlled device,
wherein the control unit sets a first threshold value serving as a criterion for determination with respect to an electrode at a position coincident with the design indicating the operable position on the design panel, also sets a second threshold value for an electrode at a position not coincident with the design indicating the operable position on the design panel so as to be greater than the first threshold value, and makes determination of the operation based on whether or not the capacitance of each of the plurality of electrodes detected by the capacitance detection unit is not less than first threshold value and less than the second threshold value.
5. The switch device according to claim 4, wherein the design panel and the electrode substrate are provided on an instrument panel of a vehicle.
6. A method for controlling a switch device that comprises an operation unit through which inputting to a controlled device is performed, a detection unit to detect an operation on the operation unit, and a control unit that makes determination of the operation on the operation unit detected by the detection unit and then transmits a result of the determination, the method comprising:
- making the determination by the detection unit connected to the control unit; and then
- transmitting a result of the determination depending on whether a function is assigned to the controlled device,
- wherein the detection unit comprises an electrode that detects the operation on the operation unit,
- wherein the determination is made by comparison between a threshold value as a criterion for determination and a voltage value obtained by converting a capacitance of an electrode into a voltage, and
- wherein a threshold value for an electrode not assigned any function of the controlled device is a greater value than a threshold value for an electrode assigned a function of the controlled device.

7. The method for controlling a switch device according to claim 6, wherein the control unit does not transmit the result of the determination when the electrode is not assigned the function of the controlled device.

* * * * *